United States Patent [19]
Debus

[11] Patent Number: 5,273,315
[45] Date of Patent: Dec. 28, 1993

[54] DEVICE FOR PROTECTING A VEHICLE WHEEL AGAINST HYDROPLANING

[76] Inventor: Klaus Debus, Am Schwarzen Moor 13, 2070, Ahrensburg, Fed. Rep. of Germany

[21] Appl. No.: 10,454
[22] PCT Filed: Feb. 27, 1989
[86] PCT No.: PCT/EP89/00185
  § 371 Date: Nov. 1, 1990
  § 102(e) Date: Nov. 1, 1990
[87] PCT Pub. No.: WO89/08030
  PCT Pub. Date: Sep. 8, 1989

Related U.S. Application Data
[63] Continuation of Ser. No. 573,039, Nov. 1, 1990, abandoned.

[30] Foreign Application Priority Data
Mar. 3, 1988 [DE] Fed. Rep. of Germany ....... 3806920

[51] Int. Cl.[5] .............................................. B60R 19/00
[52] U.S. Cl. .................................... 280/762; 280/160; 37/263
[58] Field of Search ............... 280/762, 763.1, 853, 280/160; 172/160, 510; 37/263; 244/103; 293/58; 296/81, 82, 83; 15/340.1, 340.3, 340.4

[56] References Cited
U.S. PATENT DOCUMENTS
2,631,692  3/1953  Leslie .................................... 188/5
3,650,885  8/1972  DeCardi et al. .................... 280/160

FOREIGN PATENT DOCUMENTS
397983   9/1953  Belgium .
2333853  1/1975  Fed. Rep. of Germany .
2611447  10/1977  Fed. Rep. of Germany .
1468222  2/1967  France .

Primary Examiner—Richard M. Camby
Attorney, Agent, or Firm—Chilton, Alix & Van Kirk

[57] ABSTRACT

A device for protecting the wheels of a vehicle against hydroplaning, having a water film displacement device (4,9) the displacement cross section of which is smaller than its operational cross-section. A deflecting device (11) may be arranged behind the displacement device (4,9) to deflect the hurled up water from the area of the wheel to be protected.

19 Claims, 3 Drawing Sheets

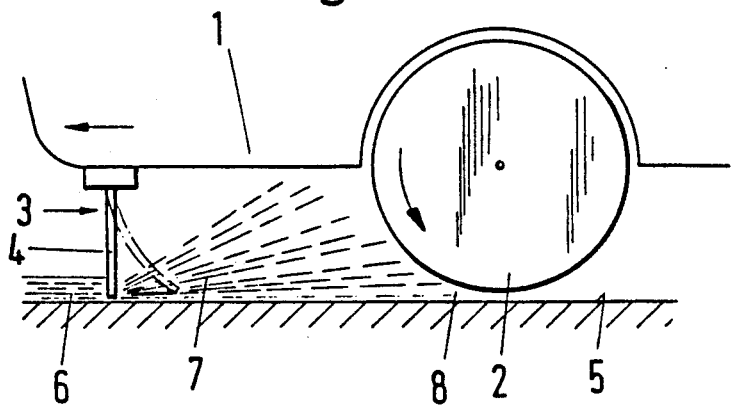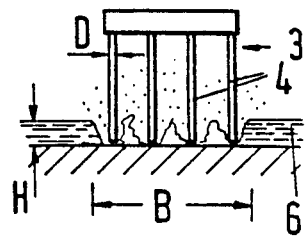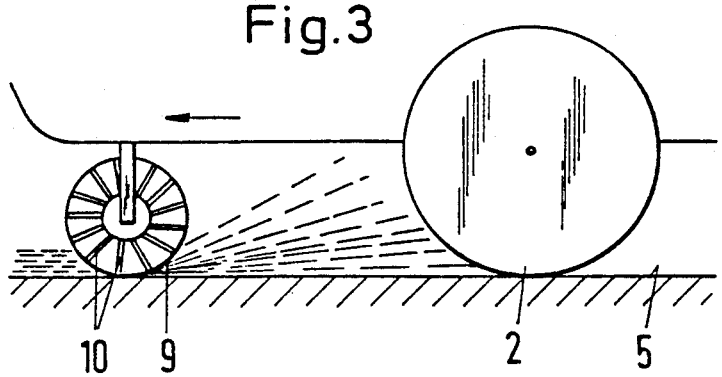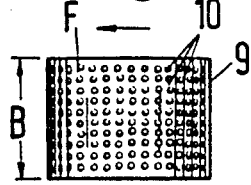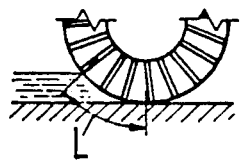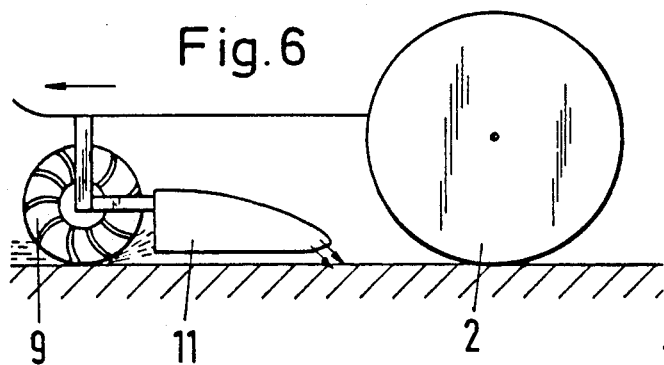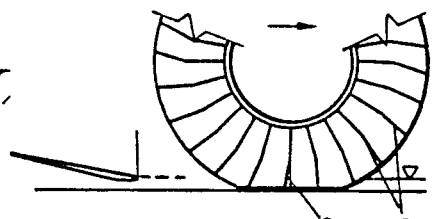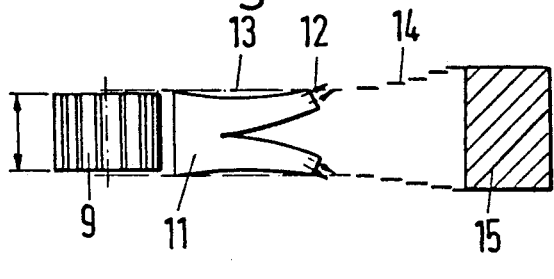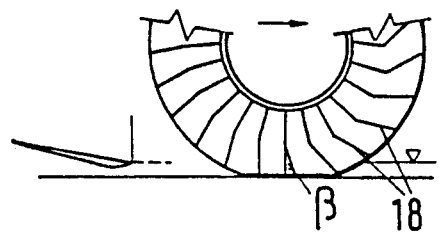

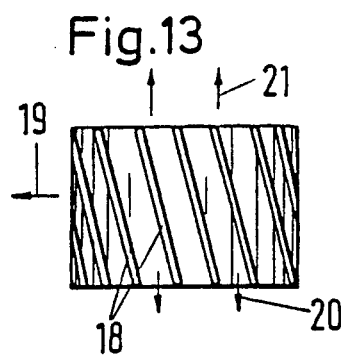
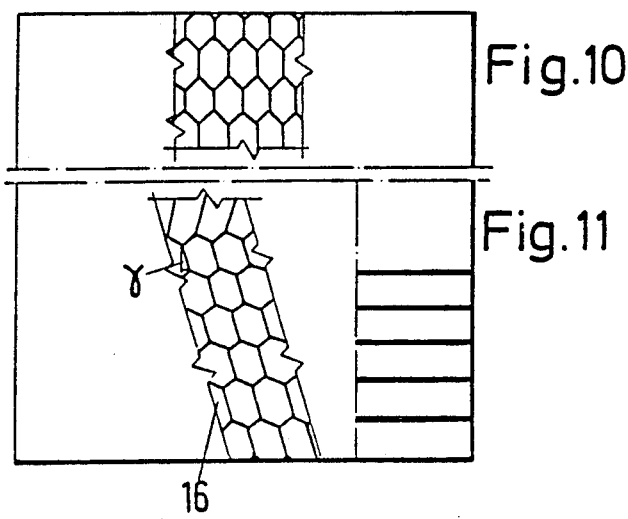
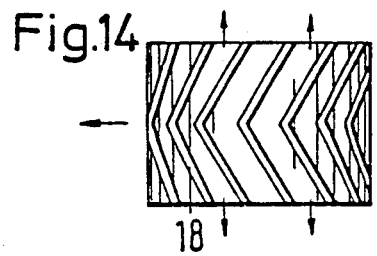
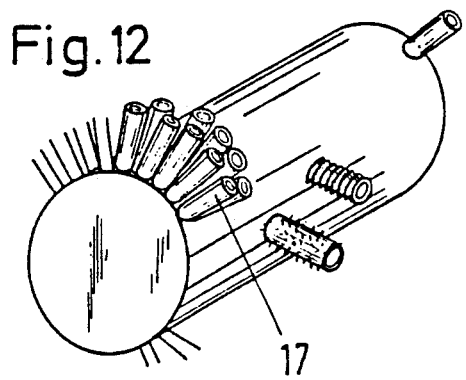
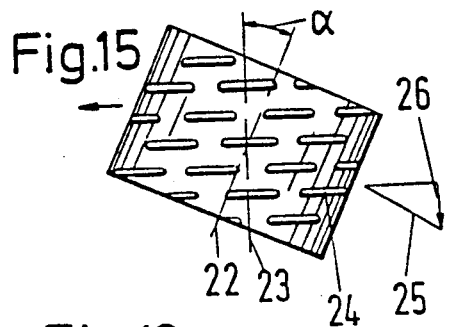
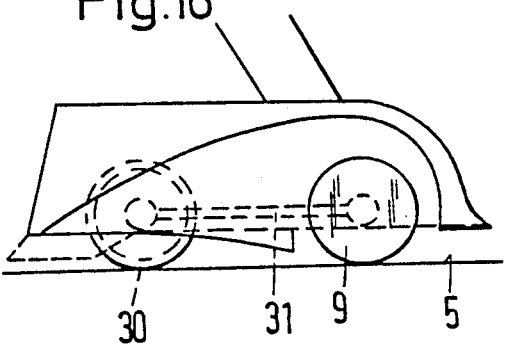
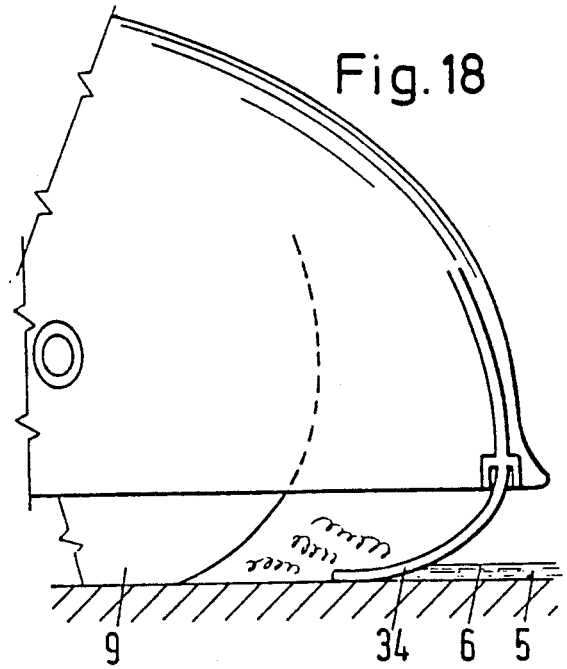
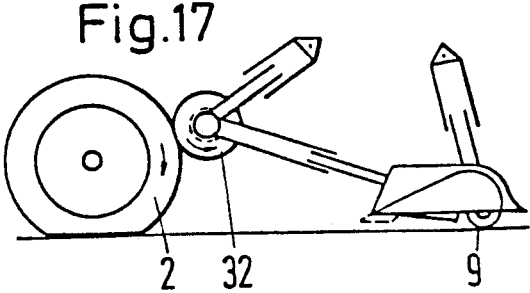

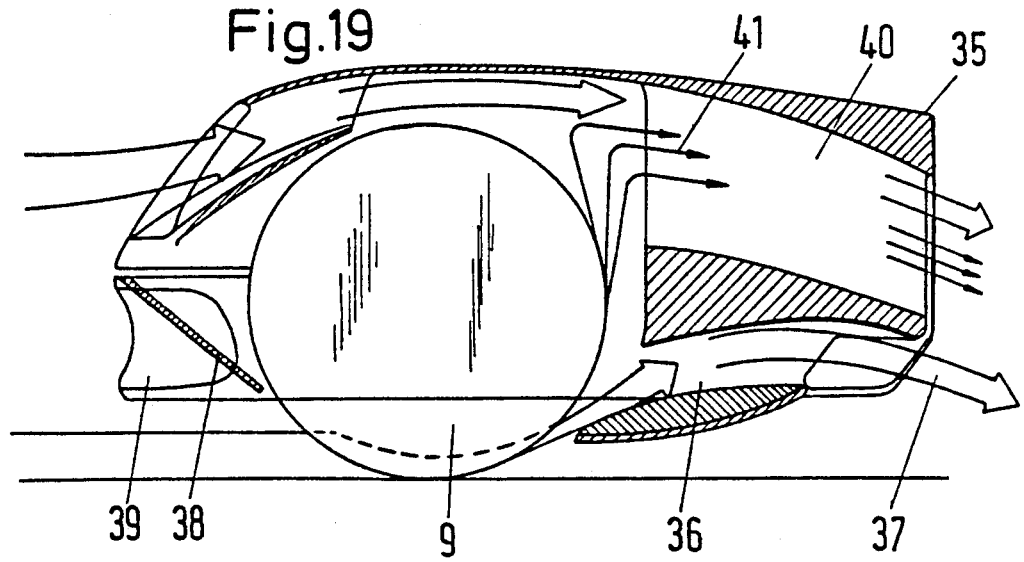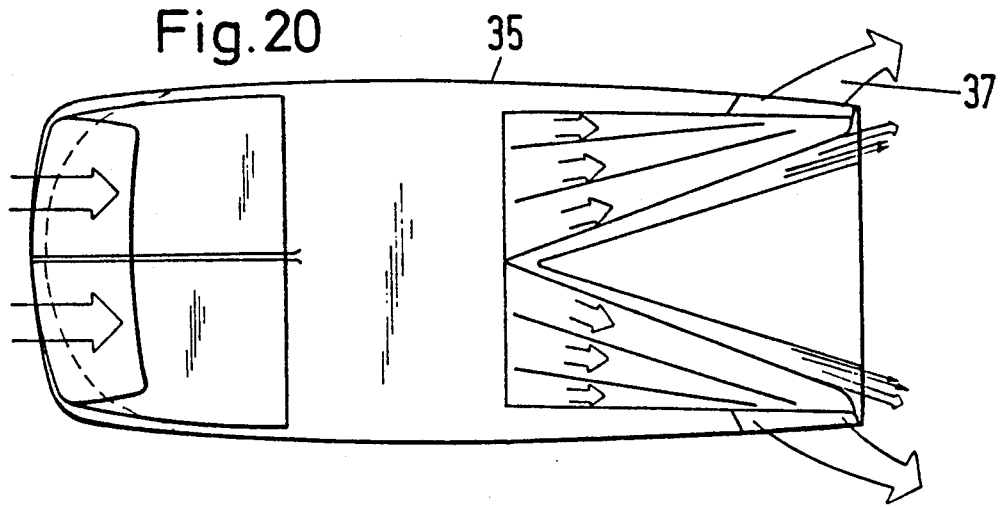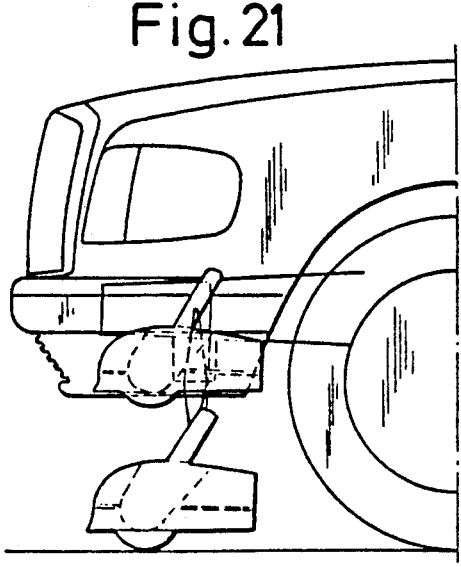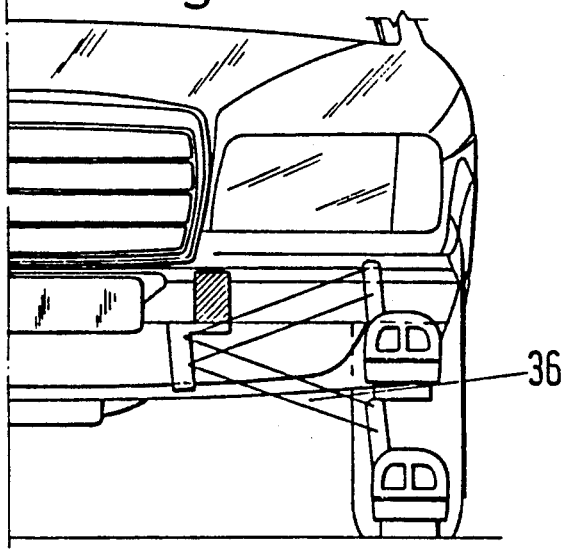

DEVICE FOR PROTECTING A VEHICLE WHEEL AGAINST HYDROPLANING

This is a continuation of copending application Ser. No. 573,039 filed Nov. 1, 1990, now abandoned.

The invention relates to a device for protecting a vehicle wheel against hydroplaning on a water film by a displacement means which penetrates into the water film and is formed by a plurality of displacement elements at a distance from one another.

It is known to put a guide blade in front of the vehicle wheel to be protected against hydroplaning, which guide blade lifts the water film and deflects it to the side. Realizing this in practice has hitherto failed because of two problems. On the one hand, such a means is only promising when it is guided at a few millimeters ground clearance above the roadway, which requires highly sensitive height control for protection against roadway irregularities. On the other hand, a high dynamic pressure acts on the means at high speeds, which dynamic pressure involves considerable mechanical problems. At least the latter also applies to a known device (U.S. Pat. No. 3,680,885) in which, instead of a closed guide blade, a brush is used whose bristles each individually can be at a distance from the adjacent bristles but which, in their entirety, act like a closed blade. The proposal to replace the small ground clearance by the use of a louver nozzle (DE-A-2,552,075) is unrealistic.

The object of the invention is to create a device of the type mentioned at the beginning which is able to meet the requirements of practice.

The solution according to the invention consists in the displacement cross-section, with regard to the direction of the movement of the displacement elements relative to the water film, of the entirety of the displacement elements in contact with the water film being substantially smaller than its operational cross-section.

The operational cross-section is to mean that area in its entirety in which the displacement means acts on the liquid film in such a way that its properties responsible for the hydroplaning are decisively changed. The displacement cross-section is to mean that area portion of the operational cross-section which is acted upon by water-displacing cross-sectional portions of the displacement means. Both areas are to be determined transversely to the direction of movement of the displacement elements relative to the water film, i.e. transversely to the direction in which the displacement elements penetrate into the water film.

In means known hitherto, the displacement cross-section and the operational cross-section are identical. For example, the displacement cross-section and the operational cross-section of a known deflecting blade are equal to the product of width times height of the blade part plunging into the water film, viewed in the driving direction. In contrast, the invention is based on the idea that it is not necessary to set fixed, deflecting parts of the displacement means against the entire operational cross-section of the water film, but that it is sufficient if the displacement means is formed from a plurality of displacement elements distributed over the operational cross-section. The reason for this is that the kinetic energy which the displacement elements, at the location where they plunge in, transmit to the water located there is also imparted as a secondary action to the cross-sectional regions not acted upon directly, as a result of which the water film in its entirety is set in vigorous movement, thrown up, dispersed, permeated by air and/or sprayed. In effect, the prevention of the hydroplaning is not only due to the fact that a portion of the liquid is removed laterally from the region through which the vehicle wheel is to pass; on the contrary, the dispersed liquid remaining in this region, for the following reasons, can also no longer exert any substantial buoyancy effect on the vehicle wheel. On the one hand, a large portion of the sprayed particles strikes the wheel at a considerable height, where they can no longer exert any substantial lifting impulse thereon and are forced away to the side. On the other hand, the density and viscosity of the liquid portion remaining in the hydrodynamically effective wedge gap in front of the tire contact surface are reduced by mixing with air in such a way that the liquid portion can be coped with by the tire without dangerous buoyancy. This means that, within the scope of the invention, even a displacement means of this type can be successful which consists, for example, of some elements which plunge comb-like into the liquid film, are formed by elastic steel wires, wire ropes, plastic fingers or the like and can easily be designed in such a way that they are insensitive to occasional impact or continuous dragging on the roadway. The latter is also connected with the fact that they are freed from the function of having to deflect the water in a certain direction from the region of the vehicle wheel and therefore do not need to have any predetermined shape or position. Their primary function consists merely in displacing the water at that location where they happen to plunge into the water film, although they also have a secondary effect on the remaining portion of the water film, since it is set in such a vigorous movement by the water displaced in a primary manner that it is likewise hurled away or at least dispersed and for the most part lifted.

A particularly advantageous embodiment of the displacement means is formed by a rotor having an axis of rotation running approximately parallel to the transverse direction of the vehicle and approximately radially running displacement elements. Its characteristic feature consists in the fact that the movement of the displacement elements relative to the water film does not coincide with the driving direction but that the displacement elements sink into the water film at an angle from above with a relative speed which is less than the driving speed. Consequently, the noise and the forces are also correspondingly lower. The definitions, explained at the beginning, of the operational cross-section and of the displacement cross-section are to be applied to the direction of the relative movement deviating from the driving direction and extend perpendicularly thereto approximately in the peripheral direction of the rotor.

In this arrangement, the cross-section of the displacement elements in the outer peripheral surface of the rotor expediently does not occupy more than about 30% of the total cross-section; furthermore, it preferably does not occupy more than about 15%. According to the invention, the displacement elements can be bar-shaped, which is also intended to include a tubular shape. They can also be leaf-shaped, which is also intended to include the combination of radial leaf elements with varying direction of their planes relative to the rotor axis, for example in the form of chambers open to the peripheral surface of the rotor and having a honeycomb or rectangular cross-section or the like.

Rotor blades which are exclusively parallel and lie in planes running transversely to the rotor axis can also be used. In general, however, the invention prefers those rotor blades which have a directional component running predominantly parallel to the rotor axis and which thus (in other words) enclose an angle of less than 45° with the transverse direction of the vehicle.

An important advantage of a rotor over a fixed displacement means consists in the fact that the rotor can roll on the roadway and therefore neither depends on ground clearance nor leads to a substantial dragging movement. The noise nuisance is also less.

The rotor action according to the invention on the water film comes about as follows. The displacement elements of the rotor, which penetrate into the film at an angle from above, allow the water in the free cross-sectional spaces located between the displacement elements and preferably designed as cells to rise in accordance with their displacement volume. However, this (statically assumed) action is secondary compared with the dynamic impact action of the displacement elements. At high driving speed, they penetrate into the water film with such a great relative speed that the water particles acted upon by them are accelerated in such a way that they are hurled away from them with great momentum and also transmit their impulse to adjacent water particles not directly acted upon. Consequently, all the water, for the most part, is sprayed up in the free cross-sectional regions of the rotor and is intermixed with air. As soon as the displacement elements have passed the bottom dead centre they perform a lifting movement which also entrains the water located in the free cross-sectional regions of the rotor. It is lifted partly by adhesion and partly by scooping action of the displacement elements.

If the displacement elements are referred to above as being arranged radially, this is only intended to indicate the approximate direction. It is very often advantageous to construct them so as to be curved forward relative to the radial direction, since this reduces the plunging resistance on the one hand and increases their lifting effect on the water on the other hand.

Good results are obtained with rotors which are driven at a peripheral speed matching the driving speed and which thus roll free from slip on the roadway. However, a peripheral speed deviating from the driving speed can also have advantages. In particular, a drive having a peripheral speed exceeding the driving speed can be expedient if the rotor blades are curved forward, whereas curvature to the rear can have advantages at lower peripheral speed of the rotor.

If the rotor peripheral speed deviates from the driving speed, an action deflecting the water laterally can also be imparted to the rotor blades by inclining them relative to the transverse direction of the vehicle. If the rotor has a lower peripheral speed than its driving speed, the water is deflected, for example, by an inclined lamella to that side on which the side edge of the lamella lies further to the rear, and vice versa at a peripheral speed exceeding the driving speed. The inclination of the rotor blades relative to the transverse direction of the vehicle is also to mean a swept-back shape.

A lateral discharge effect of the rotor can also be achieved by the rotor axis being arranged at an angle to the transverse direction of the vehicle. The displacement elements of the rotor, in the plunging region, then have a motional component in the transverse direction of the vehicle which helps to remove the liquid from the region through which the vehicle wheel is to pass. In this connection, the shape of the displacement elements is not of decisive importance. However, the said effect is assisted by a cross-sectional shape extended in the driving direction, i.e. by a shape which constitutes discharge surfaces extended transversely to the lateral discharge direction.

The rotor can be provided with a positive drive which imparts the desired peripheral speed to it, in which case this positive drive can be taken from the vehicle engine via a separate transmission of motion. A separate electric or hydraulic motor can also be provided for the rotor. It is also possible to take the movement of the rotor from a friction wheel which is pressed against the roadway or against the tread of a tire. Finally, it is also possible to dispense with a separate drive for the rotor and either to drive it by rolling it on the roadway or to leave it without drive and ground contact so that it then only rotates passively when it plunges into a water film. The latter is quite safe as a rule, since any water films generally start with a small immersion height, and therefore a relatively smooth acceleration of the rotor is possible provided it is endowed with a small moment of inertia. A brake can be provided which ensures that the peripheral speed of the rotor remains less than the driving speed if this is desired for the reasons discussed further above.

The rotor can be arranged in such a way that it essentially has roadway contact. This is possible in particular if its peripheral speed matches the driving speed and its axis runs in the transverse direction of the vehicle. Instead, it can also be arranged with slight ground clearance. For this purpose, a suitable control means can be provided. According to a further feature of the invention, a supporting wheel can be allocated to the rotor, which supporting wheel rolls on the ground in direct proximity to the rotor and is mechanically connected to its shaft bearing. In the simplest case, the supporting wheel sits with slightly larger diameter than the rotor on a common shaft with the latter, in which case it can be arranged as a single supporting wheel on one side or as a double supporting wheel on both sides. It can also be connected to the rotor in one piece in the configuration of side flanges.

According to an important feature of the invention, the displacement means is combined with a deflecting means which is arranged behind it and deflects the water sprayed up by the displacement means from the region through which the vehicle wheel is to pass. It can be designed like known deflecting blades, although it does not require such a slight ground clearance as these deflecting blades, since the water to be deflected by it has been lifted by the displacement means. For example, it is possible to arrange the bottom edge of the deflecting means one or more centimeters above the roadway. This eliminates the problem of collision with roadway irregularities.

According to the invention, the displacement means can have a smaller width than the vehicle wheel to be protected if the deflecting means arranged behind it directs the water flow towards the margins of the water film left behind by the displacement means in such a way that these margins of the water film are consequently likewise laterally accelerated and at least a considerable portion is removed from the region through which the vehicle wheel is to pass. Consequently, the cross-sectional region which the displacement and deflecting means have to act on is further reduced, and the energy transmitted in the operational cross-section to the water is utilized in a secondary manner.

The deflecting means arranged if need be behind the rotor can, as said, have a relatively large ground clearance. Nonetheless, it can be expedient to control its vertical position above the roadway. According to a further feature of the invention, this is possible by the rotor being connected to the deflecting means in such a way as to determine the height, for example by a mechanical connection to the rotor shaft or to the frame holding the rotor or by accommodation in a common housing. The height of the rotor with respect to the roadway surface is determined in a primary manner, namely in particular by rolling of the rotor or of a supporting wheel connected to it on the roadway surface; the height of the deflecting means is then obtained in a secondary manner from the height of the rotor.

If the displacement means according to the invention is constructed as a rotor, it is generally not necessary to provide additional means for separating the water film. However, the invention does not rule out the possibility of arranging such a means in front of the rotor in order to reduce thereby the displacement work to be performed by the rotor.

The deflecting means has the property that it collects the swirled-up water and directs it back laterally to the roadway. This prevents a flood of water having considerable lateral width of impetus from arising. The spread of the spray mist to the top is also dampened. This—irrespective of the hydroplaning protection—can be a desired action which can be specifically utilized primarily in goods vehicles and omnibuses in which the hydroplaning effect plays a lesser role.

The invention is described in greater detail below with reference to the drawing which, in schematic representation, illustrates advantageous exemplary embodiments and in which:

FIGS. 1 and 2 show a side and front view of a vehicle part having a first embodiment of the invention, FIG. 3 shows a side view, corresponding to FIG. 1, of a second embodiment, FIG. 4 shows the radial view of the rotor used in FIG. 3, FIG. 5 shows a partial side view of the rotor according to FIG. 4, FIG. 6 shows a side view similar to FIG. 1 of a third embodiment, FIG. 7 shows a bottom view of the arrangement according to FIG. 6, FIGS. 8 and 9 show side views of rotors having rotor blades curved forwards and respectively backwards, FIGS. 10 and 11 show radial views of a rotor having rotor blades arranged honeycomb-like, FIG. 12 shows the view of a rotor having tubular displacement elements, FIGS. 13 and 14 show radial views of rotors having rotor blades running at different angles, FIG. 15 shows a rotor having an axis arranged at an angle, FIGS. 16 and 17 show two different drive arrangements, FIG. 18 shows a partial view of an arrangement having a means, arranged in front of the rotor, for separating the liquid film, FIGS. 19 and 20 show a vertical longitudinal section and a plan view of a practical embodiment, and FIGS. 21 and 22 show a side and front view of a vehicle part containing the device according to the invention.

The vehicle, of which only a part 1 as well as a front wheel 2 to be protected against hydroplaning appears in FIG. 1, is equipped with the device 3 according to the invention, which, as a displacement means, has a plurality of fingers 4 which are connected at their top end to the vehicle 1 and essentially extend down to the surface 5 of the roadway in order to plunge into the liquid film 6. Of course, this only applies to the active state of the device when it is lowered onto the roadway. Only this state is essentially mentioned in connection with the invention. It goes without saying, however, that the device is lifted when it is not intended to be active.

When a device is referred to in connection with the invention, it goes without saying that a plurality of wheels can be equipped with such devices. As a rule, it is sufficient to equip merely the front wheels with them, since the displacement effect also comes to bear in the region of the rear wheels, which follow the track of the front wheels.

The device 3 according to FIG. 1 can be connected to a control means which sets the height of the fingers 4 in such a way that they have, as a rule, slight ground clearance. However, since the bars are of insensitive and flexible construction, it does no harm if they hit the roadway in the event of surface unevennesses and as a result are temporarily bent in the manner indicated by chain lines. The control means therefore does not need to be quick-reacting and sensitive. It is also possible to dispense with such a control means completely if the rods continuously drag on the roadway in the manner shown by chain lines or if a rotor is used as a displacement means, which rotor is described further below.

The action of the displacement means shown in FIGS. 1 and 2 consists in the bars 4 separating, spraying and swirling the water film 6, as indicated in the region 7 between the device 3 and the vehicle wheel 2. The greatest portion of the water particles strikes the vehicle wheel 2 well above the hydrodynamically effective wedge gap 8 and therefore cannot cause any hydroplaning the vehicle wheel 2. The water passing into the wedge gap 8 comprises only a thin water film on the roadway and in addition, depending on ground clearance and operational intensity of the displacement means 4, is dispersed to such an extent and permeated by air that the density and viscosity are reduced to a safe proportion.

As apparent from FIG. 2, the displacement elements 4 are arranged at a considerable mutual distance apart. Since they pass through the liquid film 6 at high speed, their displacing effect also extends to the intermediate spaces. Thus an operational cross-section can be referred to which—in this case with regard to the driving direction—has the width B and the height H of the water film, whereas the displacement cross-section is merely the product of the thickness D of the displacement elements 4 times their number n times the height H and constitutes merely a fraction of the operational cross-section. Since the expenditure of energy required for the displacement is determined by the dynamic pressure which acts on the displacement cross-section, the invention requires substantially less expenditure of energy than known devices. In addition, the invention, in the region of the displacement elements, can be satisfied with their displacement effect without having to exert a directed deflection action on the displaced liquid (even though this is possible) and can therefore give the displacement elements any shape which is suitable for their loading through any contact with the roadway and other disturbing influences.

The invention preferably provides a rotor as displacement means. Its advantage, on the one hand, is that the rolling body reacts in a considerably less sensitive manner to roadway irregularities and to foreign bodies than a fixed body. On the other hand, a rotor exhibits particularly favourable displacement kinematics. Unlike a displacement body which is firmly connected to the vehicle and penetrates in the driving direction into the liquid film to be displaced, the displacement elements located at the surface of the rotor penetrate into the water film approximately in their radial direction. They are therefore loaded in their longitudinal direction by the dynamic pressure and can therefore absorb relatively higher forces and can be designed to correspondingly finer proportions. In accordance with the direction in which the displacement elements 10 penetrate into the water film, the operational cross-section in this case is to be defined as the product of the width B of the rotor (FIG. 4) times the length L of the peripheral arc (FIG. 5) in plunging movement. In contrast, the displacement cross-section is the sum of the number n of the cross-sections F of the displacement elements 10 located in the operational cross-section. In rotors, the displacement cross-section can be in the order of magnitude of 5 to 10% of the operational cross-section.

The action of the displacement elements of the rotor takes place in two phases. In the first phase, during the penetration movement, the water directly displaced by the displacement elements as well as the water in the intermediate spaces of the displacement elements and acted upon indirectly by the displaced water is set in vigorous motion and sprayed. In the second phase, in which the displacement elements lift again, they entrain the water in their lifting movement so that, for example, a spray pattern results as indicated in FIG. 3. The effect on the vehicle wheel 2 is as described in connection with FIG. 1. Since the rotor 9 can roll on the roadway 5, a smaller, film-like residue on the roadway surface and a pronounced lifting action can be expected.

Owing to the favourable loading of the displacement elements of the rotor 9, these displacement elements can be made of a relatively flexible material, for example rubber or rubber-like materials. They are therefore insensitive to impacts from foreign bodies and to roadway irregularities. As a rule, however, resilience of the entire rotor must be provided by spring-mounted suspension on the vehicle.

Both fixed as well as—to an even greater degree—rotating displacement means have the effect that a considerable portion of the displaced water is lifted. This can be utilized by the invention by a deflecting means 11 being arranged behind the displacement means, the principle of which deflecting means 11 is described with reference to FIGS. 6 and 7. It is formed by guide surfaces which receive the lifted water emerging from the displacement means and divert it to the side in order to take it out of the region of the following vehicle wheel 2. According to FIG. 7, this can be effected in such a way that the water emerging from the deflection means 11 on either side and indicated by arrows 12 is directed towards the marginal region 13, indicated by chain lines, of the water lying outside the effective width B of the rotor 9, as a result of which a lateral impulse is exerted on this water, which impulse leads to a lateral displacement of this marginal region in the direction of the lines 14. Consequently, the effective width $B_1$ of the displacement means can be less than the width $B_2$ of the contact surface 15 of the tire 2.

The deflecting means 11 can have considerable ground clearance, since the water film 6 has for the most part been lifted by the rotor 9. The set ground clearance can be maintained by the deflecting means being mechanically connected to the rotor bearing arrangement, as indicated by the lines 27 in FIG. 6.

Different rotor shapes are described below with reference to FIGS. 8 to 15.

Rotor blades curved forward, as indicated in FIGS. 8 and 6, meet with less plunging resistance when penetrating into the liquid film and, during their lifting movement, act with a larger area on the surrounding water. They therefore produce a greater lifting effect and thus better dissolution of the liquid film. This applies in principle at every peripheral speed but is particularly pronounced when the peripheral speed of the rotor is greater than the driving speed.

Conversely, blades curved backward, according to FIG. 9, can be advisable if the peripheral speed of the rotor is less than the driving speed, which can be brought about by braking the rotor.

According to FIG. 10, provided on the rotor are leaf-shaped displacement elements 16 which complement one another to form honeycombed cells which are closed in peripheral section and are open towards the periphery. Since the lateral enclosure of the cells makes escape more difficult for the water contained in these cells and for the most part sprayed up, rotors shaped like this have a good lifting action. The arrangement, at an angle to the transverse direction, of the honeycomb cells according to FIG. 11 has the same advantages, in which arrangement a reduction in the rolling noise can also be noted.

The use of lamellae complementing one another to form closed cells also has the advantage that they support one another and can therefore be constructed to be particularly thin and resilient.

According to FIG. 12, the rotor is fitted with hollow-bar-shaped displacement elements 17 which can simply be tubular, as shown on the left in the figure, or, to intensify the displacement and lifting action, can also be provided with surface corrugations, spikes or similar irregularities, as indicated at another location in the figure.

Although the rotor according to the invention primarily has the task of dispersing and lifting the liquid film, it can also be given a lateral discharging action. If rotor blades 18 according to FIG. 13 run at an angle to the transverse direction of the vehicle and to the rotor axis, they have a lateral discharging effect as soon as a relative speed occurs in the driving direction between the rotor periphery and the water. If the rotor moving in the driving direction 19 has a peripheral speed which is higher than the driving speed, the water is laterally accelerated in the direction of the arrows 20, whereas the opposite discharge direction 21 applies when the rotor is braked.

If a swept-back arrangement of the rotor blades according to FIG. 14 is selected, a lateral discharge takes place in both directions when the peripheral speed of the rotor is less than the driving speed.

A lateral discharge effect can also be obtained by the axis 22 of the rotor, according to FIG. 15, being arranged obliquely in a horizontal plane at the angle $\alpha$ relative to the transverse direction 23 of the vehicle. Since each displacement element 24 in this arrangement moves in the direction 25, it not only has a motional component running in driving direction 19 but also a lateral motional component 26 which laterally accelerates the water acted upon. In such a case, the displacement elements 24 conveniently have a planar extension transversely to the desired acceleration direction 26.

In all examples, the rotor blades can be closed in a planar manner or, to reduce weight, can also be of open construction.

If, for reasons of wear or rolling noise or on account of rotor-surface speed relative to the roadway surface, it is desired for the rotor to have no continuous solid contact with the roadway surface, this can be achieved by a supporting disc being arranged next to the rotor, which supporting disc projects slightly further towards the roadway surface than the rotor, is orientated in the roadway direction and has a peripheral speed matching the driving speed.

In many cases, a separate drive for the rotor need not be provided; it is set in rotation by friction from the roadway and/or a liquid film located thereon. Instead, it can be provided with a separate drive motor, a hydraulic motor deserving special mention, since it enables the rotor speed to be adapted to the driving speed. Finally, the possibility of driving the rotor by means of a friction wheel should be mentioned. FIG. 16 shows the alternative in which a friction wheel 30 rolls on the roadway surface 5 and is connected to the rotor 9 via any transmission means 31, whereas according to FIG. 17 the friction wheel 32 rolls on the surface of the vehicle wheel 2. In all cases, by means which are common in technology and therefore need not be described here, provision is made for maintaining a contact pressure which ensures the transmission of friction force. Of course, the friction wheel can also be retracted when the hydroplaning protection device is not active.

FIG. 18 shows an exemplary embodiment in which a means for separating the water film is arranged in front of the rotor 9, which means is formed from a plurality of small bars or tubes 34 arranged side-by-side on the rotor housing 33 and extending down to the roadway surface 5 and its function is similar to the displacement means described with reference to FIGS. 1 and 2 but can be weaker, since only preparatory dispersion of the liquid film is intended If need be, compressed air which leads to an additional dispersion of the liquid film can be supplied through the elements, of tubular construction, of the separating means.

Whereas the representations in FIGS. 1 to 18 were schematic, FIGS. 19 to 22 give an idea of how the device can be realized in practice Accordingly, the rotor 9 is mounted in a housing 35 which is connected to the chassis via connecting and adjusting members 36 in such a way that the device can be brought alternatively into inactive and active position (FIGS. 21 and 22) and, in the active position, is pressed resiliently against the roadway.

Revealed in FIG. 19 is a channel 36 which follows the rotor 9 inside the housing 35 and which receives as a deflecting means the mass of water hurled up and hurls it in the direction of the arrows 37 towards the margins of the water film which are left behind.

In front of the rotor 9, the housing contains an inclined metal skid 38 which serves to lift the entire device largely without damage in the event of a collision with an object, for example a stone, lying on the roadway and to protect the rotor from the full impact. A rubber baffle body 39 can be arranged in front of the metal skid 38, which rubber baffle body 39 serves to direct flood water around the device in case the water film is higher than can be coped with by the rotor of the downstream deflecting means.

Located in the upper area of the housing 35 is an air channel 40 whose airflow receives that spray water 41, indicated by arrows, which could not be caught by the channel 36 and directs it downwards and to the side.

With this device, not only is the dissolution of the water film in front of the vehicle wheel 2 to be protected against hydroplaning achieved but so too is a substantial suppression of flood and spray water which would otherwise be hurled to the side and up by the wheels and would lead to the annoyance or even the endangering of other road users.

I claim:

1. An apparatus for protecting a vehicle wheel (2) against hydroplaning on a water film (6) by a displacement device (3,9) which penetrates into the water film (6) in front of the wheel (2), said device being formed by a rotor having an axis of rotation running approximately parallel to the transverse direction of the vehicle, and a plurality of radially extending displacement elements (4, 10, 16, 17, 18, 24, 34) connected thereto which penetrate into the water film (6) at a spaced distance from one another, the cross-section of the displacement elements in contact with the water film, with regard to the direction of movement of the displacement elements relative to the water film, being substantially smaller than the total operational cross-section of the portion of the device which influences the behavior of the water film, the operational cross section including the cross section of the displacement elements and the cross section of spaces between the displacement elements, the apparatus further including deflecting means arranged substantially behind the rotor and connected to the rotor for laterally deflecting the water, the deflecting means having ground clearance in an amount which is determined by the connection to the rotor.

2. Apparatus according to claim 1, wherein the density of the displacement elements in the outer peripheral surface of the rotor is not greater than about 30%.

3. Apparatus according to claim 2, wherein the density is not greater than about 15%.

4. Apparatus according to claim 2, wherein the displacement elements are bar-shaped (10) or tubular (17).

5. Apparatus according to claim 2, wherein the displacement elements are leaf-shaped (16,18,24).

6. Apparatus according to claim 5, wherein the leaf-shaped elements are rotor blades (18) which have a directional component running predominantly parallel to the rotor axis.

7. Apparatus according to claim 6, wherein the apparatus includes means for driving the rotor (9) at a peripheral surface speed exceeding the ground speed of the vehicle.

8. Apparatus according to claim 6, wherein the rotor blades are curved forward.

9. Apparatus according to claim 6, wherein the apparatus includes means for driving the rotor (9) at a peripheral surface speed below the ground speed of the vehicle.

10. Apparatus according to claim 9, wherein the rotor blades are curved backward.

11. Apparatus according to claim 7 wherein the rotor blades (18) enclose an angle with the transverse direction (23) of the vehicle.

12. Apparatus according to claim 1, wherein the displacement elements comprise rotor blades which run approximately in the vehicle direction (19).

13. Apparatus according to claim 1, wherein the rotor (9) is arranged essentially with roadway contact.

14. Apparatus according to claim 1, wherein a supporting wheel is allocated to the rotor (9).

15. Apparatus according to claim 1, wherein the displacement device (4,9) has a smaller width ($B_1$) than the contact surface of the wheel ($B_2$) to be protected, and the deflecting means (11) directs the water flow (12) towards the margins (13) of the water film (6) which are left behind.

16. Apparatus according to claim 1 including means (34) for separating the water film arranged in front of the rotor (9).

17. Apparatus according to claim 1, wherein the rotor has a shaft that is connected to the deflecting means (11) in such a way as to determine the height of the deflecting means.

18. Apparatus according to claim 9, wherein the rotor blades (18) enclose an angle with the transverse direction (23) of the vehicle.

19. Apparatus according to claim 1, wherein the speed of the rotor along a road surface is the same as the speed of the vehicle wheel along the road surface, and slipping of the rotor is thereby prevented.

* * * * *